Jan. 27, 1948. R. B. NETTING 2,434,951
LIGHTING EQUIPMENT
Filed April 8, 1942 3 Sheets-Sheet 1
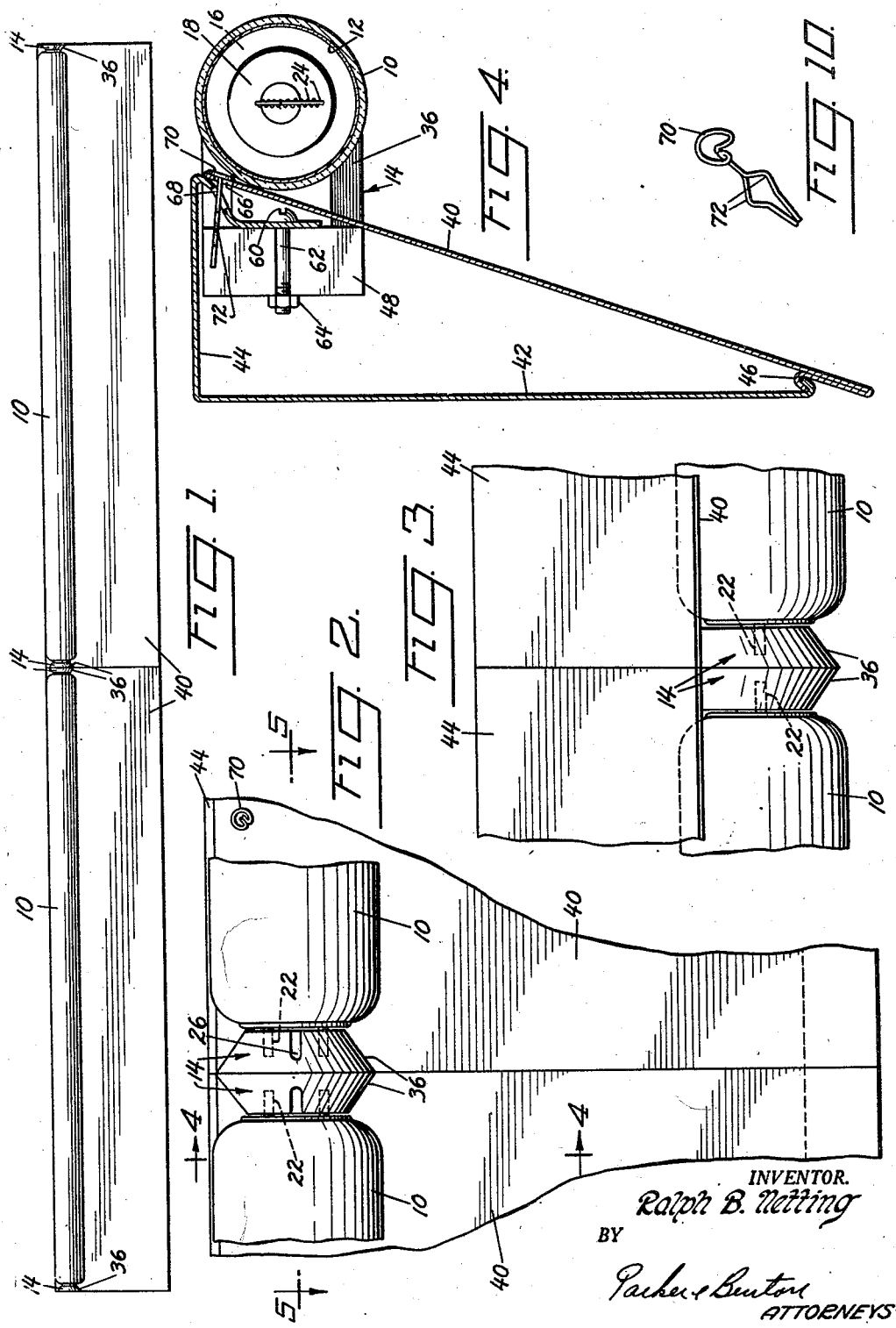
INVENTOR.
Ralph B. Netting
BY
Parker & Benton
ATTORNEYS

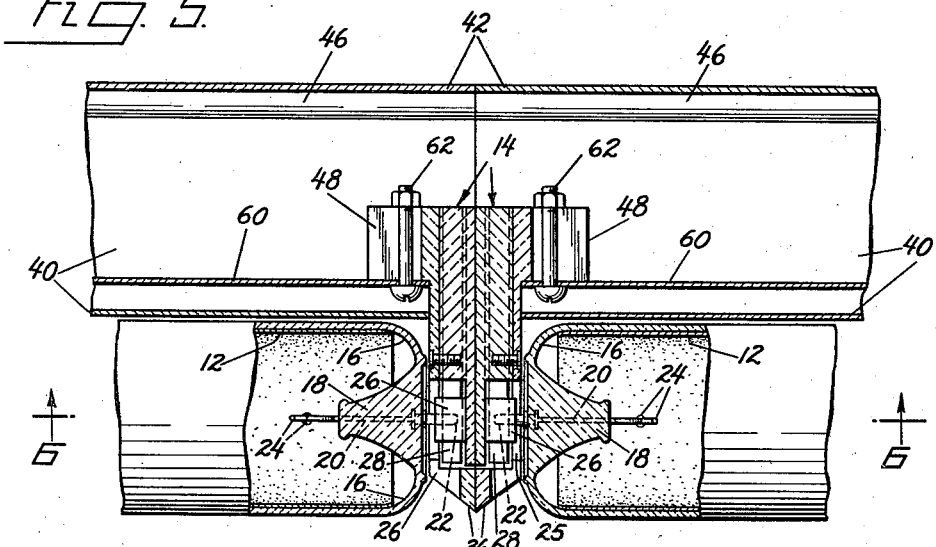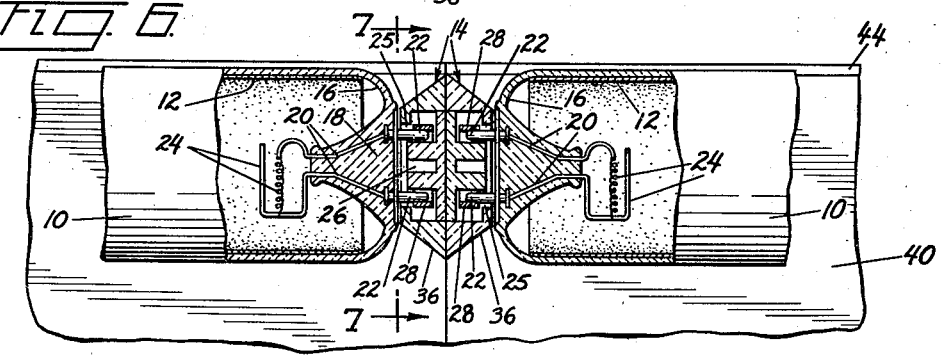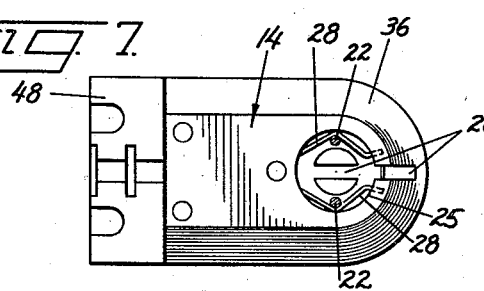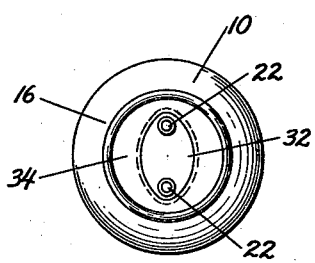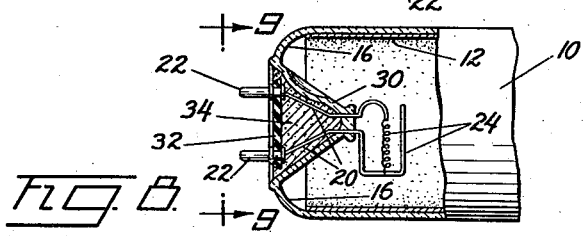

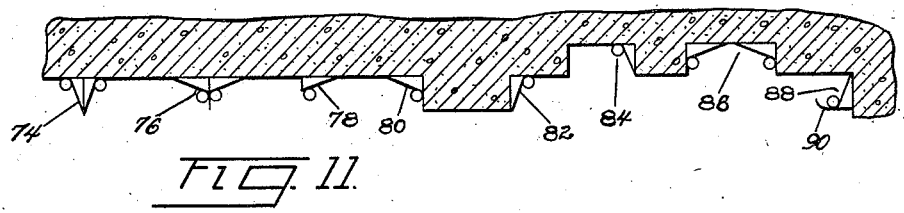
Fig. 11.
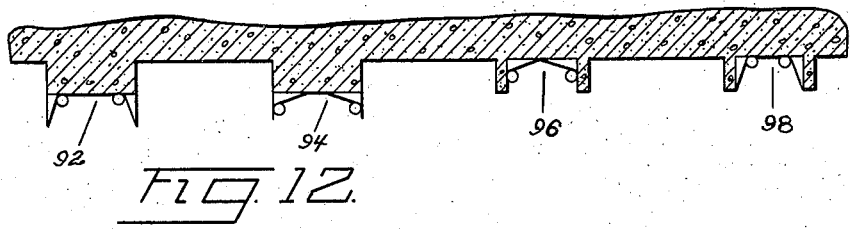
Fig. 12.
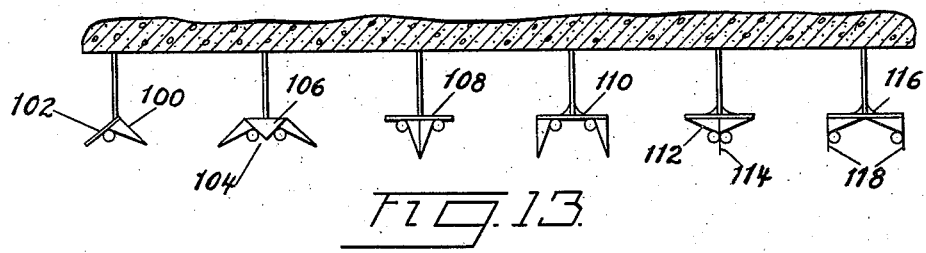
Fig. 13.
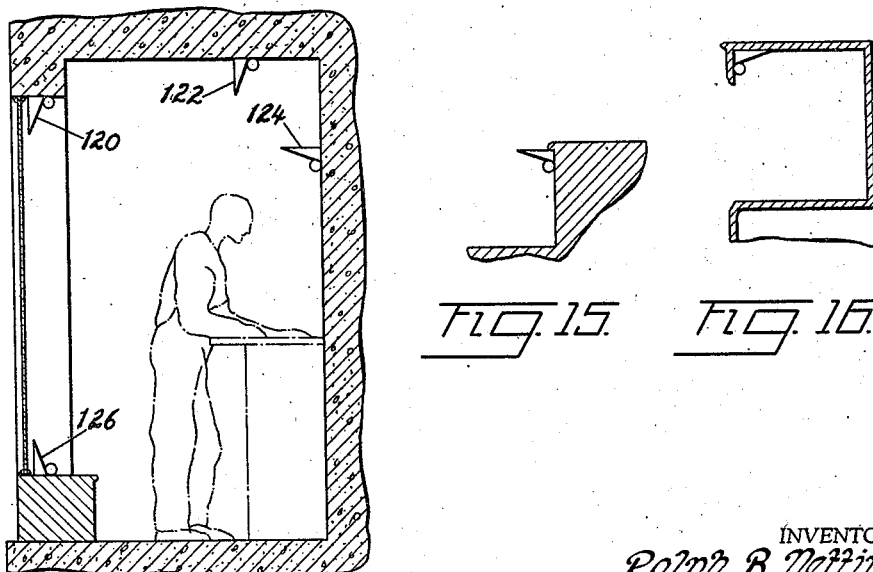
Fig. 14.
Fig. 15.
Fig. 16.

Patented Jan. 27, 1948

2,434,951

UNITED STATES PATENT OFFICE 2,434,951

LIGHTING EQUIPMENT

Ralph B. Netting, Grosse Pointe, Mich.

Application April 8, 1942, Serial No. 438,066

6 Claims. (Cl. 240—51.11)

This invention relates to improvements in lighting fixtures and similar devices and more particularly to improvements in lamps of the fluorescent tube type, supporting devices therefor, and light reflecting units associated therewith.

An important object of this invention is to provide a novel construction for fluorescent lighting tubes and the like which emit an abundance of light axially through the tube and so as to illuminate the space or parts intervening between aligned tubes as to eliminate the existence of dark areas at or adjacent to the ends of the tubes which has been characteristic of customary design heretofore. A further object of the invention is to provide a novel relationship between the ends of fluorescent tubes or the like and adjacent reflecting surfaces such that the latter receive light projected from the ends of the tube and disperse and diffuse the same so as to create an illusion of continuity of light of uniform intensity beyond the ends of the tube.

More particularly the invention comprehends a novel type of fluorecsent tube or the like so constructed as to permit axial flow of light from the interior of the tube. The ends of the tube are provided with novel end closures formed in part of light permeable material permitting the axial discharge of light and also serving to support electric contact means. Associated with either one or both ends of the tube are reflecting surfaces inclined to the axis of the tube and bearing such a relation to the axially emitted light that they pick up and disperse the light so that to an observer at a distance there are no contrasting light and dark spots at the ends of the tube.

A further object of this invention is to form the inclined reflecting surfaces on the lampholders which engage electric contact means on the ends of the tube and support the tube. The holders which engage and support the ends of the tubes are each formed in a novel fashion with an inclined surface which flares outwardly away from the axis of the tube on several sides thereof. A novel feature is the position of the inclined reflecting surface to the light discharged axially from the tube. In one illustrated form of the invention closed ends of the tube are provided with annular sections of light permeab e material through which discharge the axial beams of light. The inclined reflecting surfaces on the lampholders have an arcuate formation conforming to the annular sections on the ends of the tube and are disposed immediately adjacent thereto in position to receive the axially emitted light beams. The electric contact means on the ends of the tube such as the conventional projecting terminals are completely encircled by the annular sections. In one preferred embodiment of the invention the terminals and connecting wire are supported in light permeable material also assisting in the discharging of light from the ends of the tube.

Another important object of this invention is to provide a novel type of reflector unit which, because of its shape and the relation it bears to the light source, produces a region of reflected light in proximity to the tube which is comparable in intensity to that of the primary light source and harmoniously blends the original light with the reflected light so that all sharply contrasting light and dark lines and areas setting off one from the other are substantially eliminated. A novel feature is the disposition of the light source in the form of a fluorescent tube or the like relative to the sides of the light reflecting unit. The tube is preferably so disposed with respect to the sides of the unit that one of the sides of the unit is substantially tangent to the tube and at a location circumferentially spaced therefrom the projection of another side of the unit is likewise substantially tangent to the tube. Resulting from this tangential relationship, the reflector unit including the tube is capable of numerous novel applications either alone or in combination with other units or with fixed plane surfaces to provide improved lighting effects. Moreover, as a result of this construction a series of such reflector units can be mounted end to end and with the provision of the novel lampholders and tubes previously described produce a band of light along the entire length of the fixture which to the eye appears uniformly continuous and without the presence of contrasting light and dark areas.

A further object of the invention is to provide a reflector unit of the shape which provides quick access to the interior thereof for inspection and change of parts. Novel fastening means is provided for removably securing the exposed light reflecting panel which is inconspicuous and does not create contrasting shadow spots.

Various other objects, advantages and meritorious features will become more fully apparent from the following specification, appended claims and accompanying drawings, wherein:

Figure 1 is a front elevation of two light reflector units incorporating the invention described herein, Fig. 2 is an enlarged detail view of the juncture of the two reflector units in Fig. 1, Fig. 3 is a side view of the juncture in Fig. 2, Fig. 4 is a sectional view taken along line 4—4 of Fig. 2, Fig. 5 is a sectional view along line 5—5 of Fig. 2, Fig. 6 is a sectional view taken along line 6—6 of Fig. 5 but omitting the reflector unit for purpose of clarity, Fig. 7 is a front elevation of a lampholder modified in accordance with the invention and showing the normal position of the terminals on the lighting tube when received therein, Fig. 8 is a sectional view similar to Fig. 6 but illustrating a modification of the invention, Fig. 9 is an end view of the lighting tube constructed in accordance with this invention and taken along line 9—9 of Fig. 8, Fig. 10 is a detail view of a novel fastening element employed in the unit, and Figs. 11 to 16, inclusive, illustrate numerous applications of the lighting unit embodying the invention.

To illustrate the invention, fluorescent lighting tubes are used. It is understood that other lighting equipment may be used in place of the fluorescent tubes. A cylindrical fluorescent tube is shown but it is also understood that the tube might be elliptical or rectangular in cross section and embody the features of the invention.

The standard fluorescent tube used extensively in the trade has opaque ends. It was constructed in this way in order to close the ends of the tube and provide suitable supports for electrical terminals which project from the ends of the tube. Lampholders have been provided with recesses or sockets for receiving the electric terminals and not only to form an electric connection with a source of electric current but also to support the tube in the desired position with respect to a light reflecting surface. Where a series of such tubes were mounted in a line the opaque ends of the tube and the non-luminous lampholders produced dark areas at the juncture of each pair of fluorescent tubes. This not only reduced the visual appeal but also impaired the lighting effectiveness of the series. In my two copending applications, Serial Nos. 372,305, filed December 30, 1940, now Patent No. 2,323,073, and 390,682, filed April 8, 1941, now Patent No. 2,339,100, I have described in various ways how the reflecting surface in lighting fixtures of this character may be improved to eliminate contrasting light and dark areas. The present invention relates to improvements in the lighting tube itself, its supports and associated reflecting unit to accomplish this end.

Referring to the drawings, the usual fluorescent tube 10 is made of glass and coated on the inside with a substance 12 which fluoresces in the presence of electrical emanations. In place of the usual metal ring and opaque supporting elements at the ends of the tube I provide light permeable material in the ends of the tube which permits light produced inside the tube to be discharged axially from the ends thereof. This axially discharged light is directly visible and may also be received and dispersed by suitable reflecting surfaces, which in this instance are formed on the lampholders 14 themselves. Such reflecting surfaces are arranged to disperse the axial light in much the same manner as the light discharged radially from the circumferential surfaces of the tube.

More specifically, each end of the glass tube 10 is rolled inwardly as shown to provide an annular glass section 16 through which light may be discharged axially from the tube. In the central portion of each end of the glass tube there is a conical body indicated by the reference numeral 18. Preferably this body is a hardened mass of transparent material such as glass or plastic such as "lucite." Imbedded within this body are electric wires 20—20 leading from a pair of terminals 22—22 to the filament 24 which constitutes one electrode in the electric circuit which serves to energize the fluorescent substance on the inside of the glass. The perimeter of the body 18 may be integrally joined to the inside marginal edge of the annular section 16 such as by heat treatment which fuses the substances together.

The lampholders are provided with conventional means for receiving the terminals 22—22 to connect them to a source of electricity and to support the tube. As shown in Fig. 7, the face of the lampholder adjacent to the end of the tube is provided with a circular slot 25 intersected by a diametric slot 26 which extends out through the end of the lampholder. In the circular slot 25 on opposite sides of the diametric slot 26 are slightly bent V-shaped spring blades 28—28 which are resistingly yieldable outwardly away from one another. As customary, when installing a tube the terminals of the tube are first run through the diametric slot 26 and then turned into the circular slot where they are detachably held by the spring blades.

An alternate construction for the ends of the tube which follows more closely the present practice is shown in Figs. 8 and 9. A conical thin walled glass section 30 is mounted in the central portion of each end of the tube. Its perimeter is integrally connected to the inner margin of the surrounding annular section 16. The base of the terminals 22—22 on each end of the tube are mounted in an insulating sheet 32. This sheet is embedded in a mass of hardened plastic material 34 filling the conical recess formed by the glass section 30. The sheet 32 is preferably beveled to interlock the sheet with the material 34. The wires 20—20 extend through the material 32 from the base of the terminals to the filament structure 24 inside the tube. In the conventional construction the material 34 is an opaque wax-like substance. To aid in the production of the axial beam of light this material may be composed of light permeable material, such as "lucite." When installing and removing the tube, the tube is rotated and this imposes a strain on the parts in the end of the tube. To insure against independent rotation of any of these parts, I propose to make the insulation sheet 32 non-circular in formation. The elliptical formation shown, or a rectangular configuration, will lock the sheet against independent turning movement in the plastic material 34. Should the hardened plastic material 34 loosen it might turn in the conical section 30. To prevent this I have provided at one or more spaced points an inwardly curved depression on the conical glass section 30 which functions to key the plastic mass 32 to the conical section.

It is known that the fluorescent crystals facing the interior of the tube are more activated than those exposed through the glass. This fact is advantageously employed to strengthen the light discharged axially from the tube. Preferably, the inside surfaces of the annular sections 16 are devoid of any fluorescent crystals as shown in Figs. 5 and 6, and the inwardly facing crystals on the more remote circumferential portions of the tube are used to produce a stronger axial beam of light.

As shown in Figs. 5 and 6, the construction of the tube brings the luminous sections right up immediately adjacent the inner faces of the lampholders. As previously described novel reflecting surfaces are provided adjacent to the ends of the tube to receive the axially discharged light and reflect the same generally in the same direction as the great mass of light emanating from intermediate sections of the tube. Although various means could be used to provide this reflecting surface I have found that the lampholders themselves will serve excellently in this capacity if modified to accomplish the desired result.

Heretofore, the lampholders, composed in the main of insulating material, have been constructed of sufficient height, width and thickness to receive the terminals 22—22 and support the tube. The projecting portion 14 of which the terminals are received have been of the same thickness throughout. In the present invention, the lampholders are modified to provide an inclined face immediately adjacent the end of the tube which receives the axially discharged light and reflects the same generally perpendicularly to the direction at which it was received. This inclined face is indicated at 36 on each lampholder. It is preferably formed by beveling the edge of the lampholder adjacent the end of the tube. When extended along the three sides of the projecting portion of the lampholder it forms an outwardly flaring surface having an accurate section conforming to the cylindrical dimensions of the tube. It is obvious that this inclined face will pick up the axially directed light beams and disperse them generally normal to the axis of the tube.

More specifically, it is preferred to form the inclined face 36 on each lampholder so that it extends completely through the thickness of the lampholder as shown. This face is preferably at an inclination of approximately 45° to the axis of the tube and flares from an edge immediately opposite the inner edge of the annular glass section 16 to the remote side of the lampholder. On the arcuate section of the inclined face the remote edge is preferably on an approximate level with the outside dimensions of the tube as shown. As a result the inclined face 36 extends around three sides of the terminals 22 immediately opposite to the annular glass section 16 of the tube and in position to receive the axial light discharged therethrough. There is no part on the exposed portion of the lampholder except the rear face which is not in position to receive light from the tube supported thereby.

Another important advantage in extending the inclined face 36 from one side of the lampholder to the other is the fact that in combination with a second similarly formed lampholder supporting a similarly constructed tube it is possible to dispose the two lampholders back to back as shown and eliminate all dark areas heretofore associated with lampholders. Moreover, the light reflected from the inclined surfaces 36 of the two lampholders are so harmoniously blended that to casual observation there appears to be no break in the continuity of light discharged from the two tubes. Arranged back to back the inclined faces 36 of the two lampholders meet at a common arcute edge which is relatively sharp and therefore incapable of creating a dark area or line. As a result, the combination of two or more such sets of lamps and lampholders mounted in alignment create an illusion of continuity of light of uniform intensity extending the length of the fixture.

To obtain the most effective use of the combination of parts heretofore described, I have found it highly desirable to support the tubes by the lampholders in such positions with respect to reflecting surfaces that the latter extend substantially tangent to the tubes. In the drawings I have shown a novel reflector unit which cooperates with the tubes in reflecting the light in the most desirable manner. The reflector unit is constructed in such a fashion that it is capable of many different applications and installations. It is adaptable to all kinds of conditions, and by itself or in combination with auxiliary members it can form a great many varieties of lighting fixtures.

Referring specifically to Figs. 1 to 4, the novel light reflecting unit is generally V-shaped in appearance. That is to say, two flat sides of the unit incline toward one another and come together at a rather sharp angle forming the pointed end of the V. A third side is provided which connects the remote free ends of the inclined sides. In cross section, such as in Fig. 4, the unit is triangular. However, as more particularly pointed out hereinafter, certain features of the design may be incorporated in reflector units of entirely different construction and it is understood that the novel features of the unit herein described are not entirely limited to the type of unit illustrated.

The reflector unit comprises three flat side members indicated by the reference numerals 40, 42 and 44. Preferably, although not necessarily, the three members have the edges brought together to form a closed substantially right angle triangle as shown in Fig. 4. The side member 40 constituting the hypotenuse is preferably formed with an outside light reflecting surface. One remaining side member, namely 42, is almost the length of the hypotenuse member and the two are interlockingly joined in the manner shown at 46 in Fig. 4 forming a relatively sharp angle. The manner of connection is not important but the method shown in this figure is to be preferred. It provides a flat unbroken reflecting surface on the member 40 and at the same time the two members are removably interlocked together. The short side member 44 preferably forms an integral part of the member 42 but is bent at approximately a right angle thereto.

The parts of the unit may be secured together in any suitable way. Preferably they are removably connected to one another to permit inspection of the interior and replacement of parts. An inexpensive and convenient method of attaching and supporting the parts is shown in Fig. 4. The short side wall member 44 is provided with an inwardly extending flange 60 upon which the hypotenuse member 40 overlaps. The flange extends first inwardly and downwardly and then parallel to the side 42 and forms a slight clearance between member 40 and this flange. The flanges extend short of the ends of each unit to form a slot or opening through which the lampholders 14 extend. As shown in Fig. 5, the latter are provided with widened bases 48 which extend under the flanges. Bolt and nut assemblies 62—64 secure the base portions of the lampholders to the flanges.

Simple snap-on fasteners of the type shown in Fig. 10 may be used to secure the light reflecting side members to the flanges 60. As shown, aligned holes 68 and 66 may be provided in the flanges and the overlapping parts of the side members. Each fastener is provided with a relatively flat head 70 which will enable it to lie nearly under the fluorescent tubes, and with outwardly bent legs which will releasably grip the sides of the holes 68 when they are inserted therein. The fasteners are provided at spaced intervals along the unit, one being shown as 70 in Fig. 2. The heads of the fasteners are concealed from view by the lighting tubes but are readily accessible for withdrawal when the tubes are removed.

An important feature of the construction is the relation which the two sides 40 and 44 bear to the lighting tube associated therewith. The lampholders previously described have their base portions 48 inside the hollow interior formed by the side members and are secured to a fixed part of the unit. Each lampholder is supported so that it projects from the side member 40 adjacent to the meeting edge of this member and the short side 44. An important novel feature of the invention is the position of the terminal receiving slots with respect to the side members 40 and 44. They are so located that when the tube is supported by the lampholders at its opposite ends the hypotenuse side 40 and the projection of the short side 44 are substantially tangent to the outside dimensions of the tube as shown in Fig. 4. By substantially tangent is meant either actual contact or so close that the slight clearance does not produce any contrasting dark areas under the tube. This tangential relationship enables the reflecting unit to be used in many applications without creating contrasting dark areas in the vicinity of the tube, such as between the tube and the reflecting surface.

In Figs. 11 to 16, inclusive, I have shown many applications in which one or more reflecting units of the type described herein may be used. These applications show uses in commercial, industrial and home environments. In many of these applications, the lighting tube is exposed and capable of being viewed directly. The absence of contrasting light and dark areas permits such a use without imposing a strain on the eyes. In all cases the light projected from the unit is a soft diffused uniform band gradually decreasing in intensity from the original source of light outwardly along the light reflecting surfaces. The unit is self-contained and the operating parts are readily accessible for replacement and repair.

Referring specifically to Figs. 11 to 16, inclusive, Fig. 11 shows various ceiling arrangements of lighting units embodying the invention. In these arrangements the ceiling is made to form part of the light reflecting system. The ceiling, for example, in the four installations at the left of Fig. 11 extends tangential to the tube. This results from the tangential relation of the two sides 40 and 44 to the tube. Formation of contrasting light and dark areas is prevented by this means, especially between the tube and the ceiling which would occur if the tube were spaced from the ceiling.

Specifically, Fig. 11 shows at 74 a vertical double arrangement of lighting units and at 76 a horizontal double arrangement. A single horizontal lighting unit is shown at 78. Horizontal and vertical cornice lighting arrangements are shown at 80 and 82 respectively. Recessed troffer arrangements are shown at 84 and 86. A cove light is arranged at 88. An upturned auxiliary sheet 90 which extends tangential to the tube contributes to the cove effect.

In Fig. 12, various beam treatments are illustrated. At 92 two lighting units are arranged vertically to form a soffit; at 94 the units are horizontally arranged to provide a different type of soffit fixture. Recessed troffer arrangements are shown at 96 and 98.

Fig. 13 illustrates various forms of pendant lights that may be created with the use of this lighting equipment. A simple shop light is shown at 100. A flat reflector sheet 102 is attached to the short side 44 to direct the light downward. A double type of shop light is shown at 104. The short sides 44 in this example are secured to the sides of a triangular bracket 106. In the next example to the right, two units are arranged back to back in vertical position on a back board 108. In the next illustration, the units are spaced apart and turned around and have their short sides secured to a back board or open bracket 110. At 112 the units are disposed horizontally on a bracket with their short sides in juxtaposition. A center vane 114 extends tangentially between the two tubes. In the next view the units are arranged in horizontal position on a bracket 116 but with their apexes in juxtaposition. Side vanes 118—118 are provided which form extensions of the short sides of the units and extend tangential to the tubes.

Fig. 14 illustrates various special treatments. At 120 a unit is arranged in vertical position under a window head. A valence type of arrangement is shown at 122 and a bench light at 124. A foot light such as that adjacent to the floor or even upon a stage is illustrated at 126.

Fig. 15 shows an arrangement for illustrating a floor display. In Fig. 16 a unit is installed in the interior of a display case.

What I claim:

1. In combination, a light-diffusing surface, a substantially cylindrical fluorescent lighting tube having electric terminals on the opposite ends, a pair of aligned lampholders projecting from said reflecting surface and spaced apart a distance equal to substantially the length of the tube, said lampholders each provided on the sides facing one another with one or more contacts for engaging the terminals on the ends of the tube and supporting the tube, each lampholder having an arcuate light diffusing face corresponding generally in diameter to that of the tube and partially encircling said contacts, said arcuate face being inclined outwardly away from said inwardly facing side of the lampholder on the several sides of the apertures around which it partially extends, said tube being constructed to discharge light axially from the ends thereof such that when the tube is supported by said lampholders the axially discharged light falls on said inclined faces.

2. In combination, an elongated light diffusing surface, a pair of spaced apart aligned lampholders projecting from said reflecting surface and provided on the sides facing one another with one or more contacts for engaging electrical terminals, a fluorescent tube of substantially cylindrical formation having electric terminals on the opposite ends capable of being engaged by said contacts of the lampholders, said tube formed on the ends around said terminals with light permeable material permitting light produced inside the tube to be discharged axially therefrom, the edge of each lampholder remote from said reflecting surface being curved on a radius substantially equal to that of the tube and beveled to present an inclined arcuate face flaring away from the tube and adjacent thereto, said inclined faces on the lampholders adapted to receive the light discharged axially from the ends of the tube when the latter is supported in said lampholders and reflect them generally outwardly from the reflector.

3. In combination, an elongated diffusing surface, a substantially cylindrical fluorescent lighting tube having terminals projecting from the opposite ends, a pair of lampholders projecting from said surface in spaced apart relationship and provided on their inwardly facing sides with recesses for receiving the terminals of the tube and supporting the tube thereby, said recesses being spaced from the surface such a distance that when the tube is supported by the lampholders the surface extends substantially tangent to the outer surface of the tube, the end of each lampholder remote from said surface being formed in an arc the outside radial dimension of which is substantially that of the tube and beveled to provide an inclined outwardly flaring light diffusing face on three sides of the recess in the lampholder, and light permeable material in the adjacent ends of the tube permitting light produced within the tube to discharge axially therefrom upon the said face and to be reflected therefrom in a direction normal to the axis of the said tube.

4. In combination, a diffuser including two flat light diffusing members arranged at an angle to one another with the edge of one contiguous to the edge of the other, a fluorescent tube, a pair of lampholders projecting from the side of one of said members opposite to the other member but adjacent to their contiguous edges, said lampholders being spaced apart a distance substantially that of the tube and provided with means for supporting the tube so that the respective planes of the two members are substantially tangent to the tube, light permeable material in the opposite ends of the tube permitting light produced therein to discharge axially from the tube, and inclined light diffusing faces formed on the lampholders receiving said axially discharged light and reflecting the same generally radially of the axis of the tube.

5. A lighting unit comprising, in combination, two flat light diffusing members arranged at an angle to one another with an edge of one contiguous to an edge of the other, one of said members having the sides thereof remote from the other member formed as a light diffusing surface, a substantially cylindrical fluorescent tube, a pair of lampholders projecting from said light reflecting surfaces adjacent to said contiguous edges of the members, said lampholders provided with means for engaging the ends of the tube and supporting the same such that said surfaces and the plane of the other member are substantially tangent to said tube at two circumferential spaced points, light permeable material in the ends of the tube permitting light produced therein to discharge axially from the opposite ends of the tube, the outer ends of said lampholders each having an arcuate formation conforming to the cylindrical dimension of the tube lying adjacent the end thereof and provided with inclined light diffusing faces flaring outwardly away from the tube on several sides thereof, said inclined faces being adapted to receive light discharged axially from the tube and reflect the same generally radially outwardly of the axis of the tube.

6. A light projecting unit comprising, in combination, two relatively flat members arranged at an angle to one another with an edge of one contiguous to an edge of the other and both adapted to diffuse light, a fluorescent lighting tube, a pair of lampholders projecting from the surface of one of said members on the side of the member opposite to the other member and adjacent to said contiguous edges, and means on said lampholders for engaging said tube and supporting the same relative to said members so that the light-diffusing surface from which the lampholders project is substantially tangent to the tube and the projection of a similar surface on the other member is likewise substantially tangent to the tube and surfaces formed on said lampholders effective to reflect light emerging endwise of the tube in a direction radial to the tube axis.

RALPH B. NETTING.

REFERENCES CITED

The following references are of record in the file of this patent:

UNITED STATES PATENTS

| Number | Name | Date |
|---|---|---|
| 2,135,732 | Randall et al. | Nov. 8, 1938 |
| 2,170,066 | Ruben | Aug. 22, 1939 |
| 2,273,960 | Hopkin | Feb. 24, 1942 |
| 2,278,079 | Knouse et al. | Mar. 31, 1942 |
| 2,262,586 | James | Nov. 11, 1941 |
| 2,274,612 | Johnston | Feb. 24, 1942 |
| 1,877,932 | Meyer et al. | Sept. 20, 1932 |
| 2,288,606 | Callahan | July 7, 1942 |

FOREIGN PATENTS

| Number | Country | Date |
|---|---|---|
| 469,485 | Great Britain | 1937 |
| 284,537 | Germany | 1915 |
| 541,144 | Great Britain | 1941 |

OTHER REFERENCES

Page 9 of Catalog H by Efcolite, Trenton, N. J., of January 1940.

Page 7 of Bulletin #4 of May 1, 1941, by Ender Mfg. Corp., 260 West St., New York city.